United States Patent
Velin et al.

(10) Patent No.: US 6,558,754 B1
(45) Date of Patent: May 6, 2003

(54) APPARATUS FOR DISTRIBUTION OF PARTICLES ON PAPER, PROCESS FOR PROVIDING PAPER WITH PARTICLES AND PARTICLE COATED PAPER

(75) Inventors: Per-Erik Velin, Båstad (SE); Brian Perkins, Southampton (GB); Jan-Olof Bengtsson, Tyring (SE); Henrik Frosthagen, Hässleholm (SE)

(73) Assignee: Pergo (Europe) AB, Trelleborg (SE)

( * ) Notice: Subject to any disclaimer, the term of this patent is extended or adjusted under 35 U.S.C. 154(b) by 0 days.

(21) Appl. No.: 09/403,302

(22) PCT Filed: Apr. 8, 1998

(86) PCT No.: PCT/SE98/00645
§ 371 (c)(1),
(2), (4) Date: Nov. 30, 1999

(87) PCT Pub. No.: WO98/47705
PCT Pub. Date: Oct. 29, 1998

(30) Foreign Application Priority Data

Apr. 21, 1997 (SE) ................................ 9701466

(51) Int. Cl.⁷ ............................ B05D 1/06; B05B 5/025
(52) U.S. Cl. ...................... 427/470; 427/475; 427/482; 118/627
(58) Field of Search ................................ 427/470, 475, 427/474, 477, 482, 180, 202, 204, 205; 118/621, 623, 627; 428/148, 149; 51/295, 307–309

(56) References Cited

U.S. PATENT DOCUMENTS

| | | | |
|---|---|---|---|
| 3,468,691 A | * | 9/1969 | Watkins |
| 3,486,484 A | * | 12/1969 | Bullough |
| 3,723,925 A | * | 3/1973 | Alten |
| 4,473,613 A | | 9/1984 | Jaisle et al. |
| 4,547,204 A | * | 10/1985 | Caul |
| 4,940,503 A | * | 7/1990 | Lindgren et al. |
| 5,368,618 A | * | 11/1994 | Masmar et al. |
| 5,695,533 A | * | 12/1997 | Kardys et al. |

FOREIGN PATENT DOCUMENTS

| | | |
|---|---|---|
| GB | 1094619 | 12/1967 |
| GB | 1348272 | 3/1974 |
| GB | 1348272 | 2/1975 |
| SE | 504501 | 2/1997 |

\* cited by examiner

*Primary Examiner*—Fred J. Parker
(74) *Attorney, Agent, or Firm*—Stevens, Davis, Miller & Mosher, L.L.P.

(57) ABSTRACT

The invention relates to an apparatus (1) for distribution of hard particles to the surface of a paper web (20) impregnated with resin. The apparatus includes a feed hopper (3), a rotating doctor-roll (2) placed under the feed hopper (3). The doctor-roll (2) is in spaced relation to said paper web (20) fed under the doctor-roll (2). There is a means for releasing the particles from the doctor-roll (2) and distributing them evenly on the fed paper web. Said means comprises an electrode arrangement (4). The electrode arrangement (4) is enclosed by a casing (5) provided with a downwards direction sliding plate (7). The invention also includes a process where the apparatus is used as well as particle coated paper produced by the process.

28 Claims, 1 Drawing Sheet

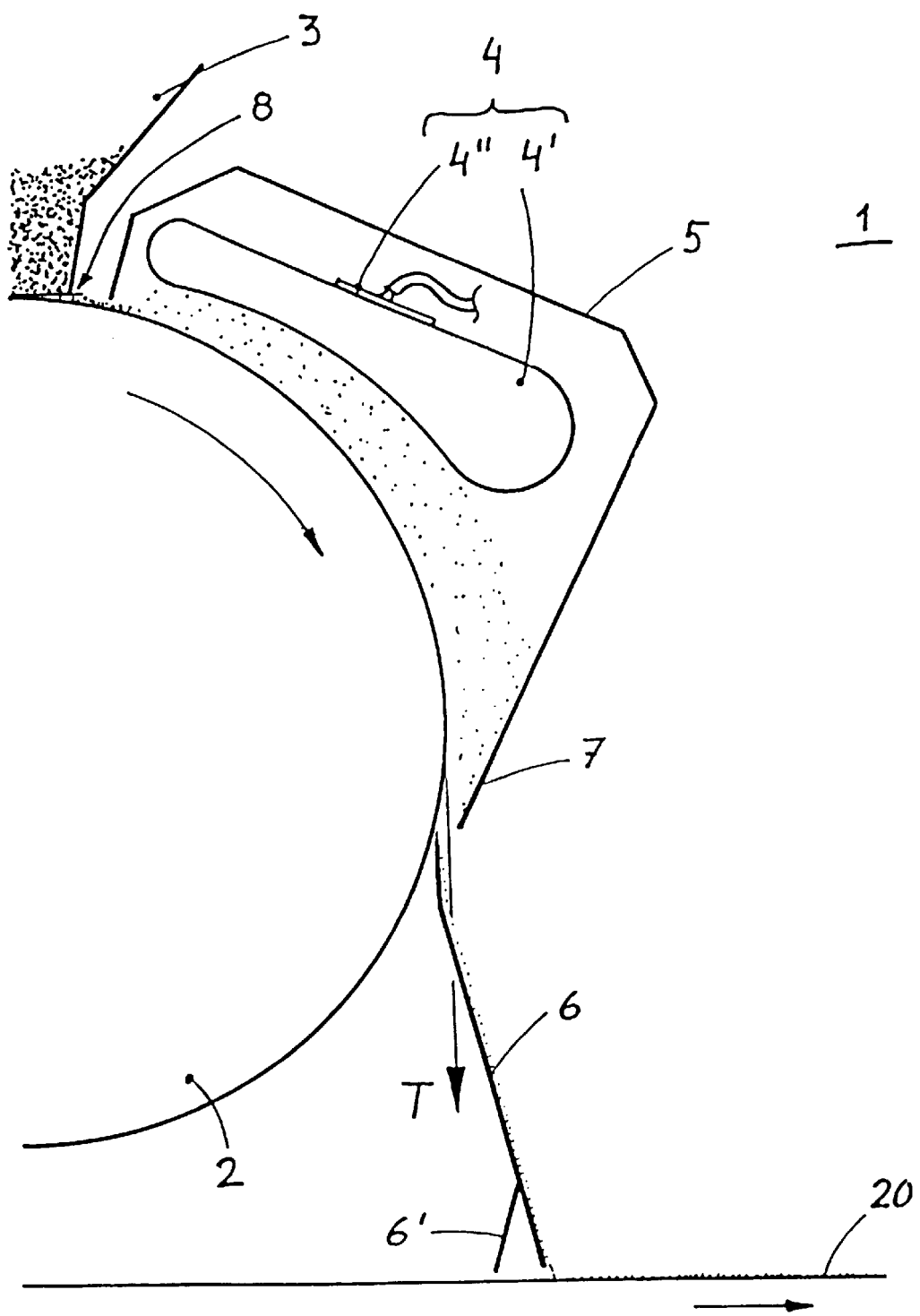

APPARATUS FOR DISTRIBUTION OF PARTICLES ON PAPER, PROCESS FOR PROVIDING PAPER WITH PARTICLES AND PARTICLE COATED PAPER

BACKGROUND OF THE INVENTION

1. Field of the Invention

The present invention relates to an apparatus for even distribution of dry hard particles to the surface of a continuously fed paper web, a process for providing the surface of a decor paper or an overlay paper for an abrasion resistant laminate with an even layer of small, hard particles and a particle coated decor paper or overlay paper produced by the process.

Products covered with a decorative thermosetting laminate are frequently used today. They are mostly used where the demands for abrasion resistance are high, but also where a resistance against different chemicals and humidity is required. Floor boards, floor skirtings, table tops and wall panels can be mentioned as examples on such products.

2. Description of the Related Art

Decorative thermosetting laminates are often made of two to seven Kraft paper sheets impregnated with phenol-formaldehyde resin and a decor paper sheet impregnated with melamine-formaldehyde resin or another thermosetting resin. The decor paper sheet can be monochromatic or patterned for instance with a wood pattern or a fancy pattern and placed as a top layer in the laminate.

Often one or more so-called overlay sheets of α-cellulose usually impregnated with melamine-formaldehyde resin are placed on top of the decor paper to protect the decor paper sheet from abrasion.

There are also laminates consisting of a base layer of particle board or fibre board provided with such a decor paper sheet and possibly an overlay sheet. These sheets can be laminated towards the base layer under heat and pressure. If a decor paper only is used and no overlay sheet, the decor paper sheet can be glued towards the base layer instead.

To further increase the abrasion resistance of the decor paper sheet and/or the possible overlay sheets these may be provided with a coating of hard particles. These particles can be applied to the paper by mixing them into the thermosetting resin used for impregnating the paper. The particles can also be added to the wet cellulose fibers on the wire of a paper machine. Finally it is known to coat the resin impregnated paper with hard particles by applying the hard particles onto the paper before drying the resin.

The first method is illustrated for instance in U.S. Pat. No. 4,473,613. This method results in an uneven distribution of the hard particles and thereby an uneven abrasion resistance of the decorative laminate. The reason is that it is very difficult to disperse average size and bigger particles in a resin solution since these due to their higher density will sink to the bottom of the vessel used for storing the resin. Such a dispersion will therefore be practically unusable since the number of hard particles per surface unit will vary as time goes. This problem can partly be counteracted by increasing the viscosity of the resin solution by an addition of a thickener. However, such additives will deteriorate the properties of the resin and give a worse end result. In addition, even with a thickener it will be difficult to change the amount of hard particles per surface unit if so desired since also the resin content will be changed.

The second method mentioned above can be illustrated by the U.S. Pat. No. 3,798,111. The method disclosed in this patent is generally used for the production of overlay paper of α-cellulose. The hard particles for instance of aluminium oxide are then spread over a layer of wet α-cellulose fibers on the wire of a paper machine. With this method, the hard particles are distributed more or less irregularity within the whole fibre layer. Some of the particles even pass through the wire and cause serious pollution problems in the paper making machine. In the overlay paper obtained the hard particles will be distributed in an uncontrollable way. It is impossible to get an even distribution of the hard particles on the surface of the paper, where they give the best effect against abrasion.

In the above U.S. Pat. No. 3,798,111 a decor paper is made with the method disclosed, whereupon a decor is printed on top of the produced paper. Since the hard particles are situated below the decor they cannot possibly give an increased abrasion resistance. In spite of the disadvantages mentioned the method is videly used commercially for the production of abrasion resistant overlay sheets.

The third method mentioned above can be illustrated by our own U.S. Pat. No. 4,940,503, where the hard particles are applied to a continuous decor paper or an overlay paper which is impregnated with a liquid solution of a thermosetting resin. The resin is wet when the particles are coated on the paper. The paper is dried when the particles have been added.

The particles are distributed by means of a device comprising a container containing the hard particles and a rotating doctor-roll with an uneven surface placed under the container, whereby the particles are intended to fall from the container to the doctor-roll and then be evenly distributed on the paper web fed under the doctor-roll. The device usually contains an air knife intended to get the particles to come loose from the doctor-roll at a constant amount per unit of time.

Decorative thermosetting laminates produced for flooring boards where at least one overlay has been provided with hard particles by said method have been tremendeously successful.

The method is by far the best commercial one for production of highly abrasion resistant decorative thermosetting laminates. The particles are distributed very evenly on the paper web.

However, sometimes you find clusters of particles sticking together on the surface of the coated paper resulting in patchy or hazy areas. Between these clusters there are minor areas lacking particles. If the formation of such clusters could be avoided by an even better distribution of the particles the abrasion resistance would increase without addition of a higher amount of hard particles. A decrease of the cluster formations would also improve the decorative effect of the decorative laminate. Thus, there is a need for improvement of this process for even distribution of hard particles to the surface of a continuously fed paper, especially an overlay paper for abrasion resistant laminates. These laminates constitute the top layer of flooring boards which usually have a base layer of particle board or fibre board to which the laminate is glued. The flooring boards are furnished with groove and tenons in the side edges as ordinary flooring board of wood.

SUMMARY OF THE INVENTION

According to the present invention it has been possible after an extensive development work lasting for years to meet the above need. Thus, the present invention relates to an apparatus for even distribution of small hard particles to the surface of a continuously fed paper web impregnated with a liquid thermosetting resin composition, the resin being wet at the distribution of the hard particles. The apparatus includes a feed hopper containing the hard particles. The hopper has an outlet extending transversely of said fed paper web. A rotating doctor-roll preferably with an uneven surface is placed under the feed hopper and is in communication with said outlet for reception of hard particles therefrom. The doctor-roll is in spaced substantially parallel relation to said paper web fed under the doctor-roll. The apparatus also has a means for releasing the hard particles from the doctor-roll and distributing them evenly on the fed paper web. This means comprises an electrode arrangement placed between the feed hopper and the downwards directed vertical tangent (T) of the doctor-roll. The electrode arrangement is preferably enclosed by a casing provided with a downwards directed sliding plate, whereby the hard particles are lifted from the doctor-roll and fluidized by means of an electric field between the electrode arrangement and the doctor-roll resulting in an even amount of particles falling down on the paper web fed under the doctor-roll.

As mentioned the surface of the doctor-roll is preferably uneven. Suitably this unevenness consists of 1–100 μm, preferably 30–70 μm deep grooves oriented axially, radially or diagonally over the surface of the doctor-roll. The unevennesses can also consist of pits with the same depth as above. However, it might also be possible to use a doctor-roll with an even or rather even surface.

The feed hopper is suitably provided with a scraper plate at its outlet to give an even feeding of the particles along the surface of the doctor-roll. The scraper plate will allow the particles situated in these grooves or pits to be brought in the rotation of the doctor-roll while the other particles are prevented from coming with the doctor-roll at the rotation thereof. In this way the amount of particles can easily be controlled by amendment of the rotation velocity of the doctor-roll as the doctor-roll will always be fed with a fixed amount of particles per surface unit from the feed hopper. The amount of particles fed per surface unit depends on the depth of the grooves or pits, on the distance between these grooves or pits and also on the particle size.

Preferably the doctor-roll, the feed hopper and the paper have about the same voltage potential while the electrode arrangement has a positive or preferably a negative voltage potential of at least 1 kV as compared to the doctor-roll. The doctor-roll is preferably grounded and thereby uncharged. At least the surface of the doctor-roll is made of a conducting material, suitably a metal. The suitable voltage potential depends on the distance between the electrode arrangement and the doctor-roll, the particulated material and to a certain extent the moisture of air. By changing the distance and the voltage potential also the intensity of field will be changed. However, intensities of field which can result in lead should be avoided.

Voltages amounting from 1–15 kV might be useful but tests have shown that 2–8 kV is enough at a distance between the doctor-roll and the electrode of 5–20 mm with aluminium oxide particles with an average size of 40–90 μm. Suitably the aluminium oxide particles have the form $\alpha\text{-}Al_2O_3$ which is not hygroscopic. The distance between the doctor-roll and the electrode may be about 2–50 mm, preferably about 3–30 mm or 5–20 mm.

The sliding plate mentioned above is used to guide the stream of particles to the paper. Preferably the sliding plate is placed in such a way that at least its extension will cross the downwards directed tangent (T) at an angle of 5–50°. The sliding plate is possibly followed by further sliding plates which are placed under the first sliding plate and have an angle towards the vertical tangent (T) of 5–50°. As to the angle of the sliding plates towards the vertical tangent (T), small angles such as angles within the interval 5–25° are preferred since differences in friction coefficient between the particles can influence their sliding velocity. The difference in sliding velocity caused by the difference in friction coefficient will increase at larger angles. This can have an impact on the dispersion degree of the particles on the paper surface.

The sliding plates are made of an conducting material, suitably a metal. Preferably, the sliding plate and possible further sliding plates have the same voltage potential as the doctor-roll. Since the sliding plates are grounded and thereby mainly lack deficit or surplus of electrones any possibly remaining charge of the hard particles will be conducted away by the sliding plates. Thereby the particles will not be attracted to the sliding plates and stick thereto. In addition the particles are completely uncharged when they reach the paper.

The lower edge of the lowermost sliding plate is preferably situated only a millimetre up to a few centimetres from the paper surface. If only one sliding plate is used this will of course be regarded as the lowermost one. Thereby, the sliding plate will in addition to conducting away possible charges from the particles also give a sharply limited distribution zone. This will decrease the disturbing influence of air streams and thereby give a more even distribution of the particles on the paper surface.

In order to prevent the hard particles from sticking to the sliding plate and possible further sliding plates, for instance due to surface tension or other similar phenomena, the plates are suitably arranged in a resonance free vibration by means of a vibrator. In this way the hard particles are prevented from stopping or sticking to the sliding plate or the further sliding plates at their passage towards the paper. The vibrator can either work directly with the plates or be of an acoustic type and thereby indirectly bring the sliding plates and the surrounding air in vibration.

Suitably the surface of the sliding plates facing the distributed hard particles is polished to a highly glossy state. In this way the particles will also be prevented from sticking to the sliding plates.

Since the hard particles normally are very small the coating process can be disturbed by air streams which can cause local clusters of particles and local areas without particles. Therefore, the device is suitably encased and possibly provided with aerodynamic spoilers near the paper for avoiding disturbing air streams.

The electrode arrangement suitably consists of one or more electrodes preferably of a semiconducting material such as phenolic resin. The electrode/electrodes are electrically connected to a voltage source via an electrically conductive distributor which suitably runs along the main part of the horizontal extension of the electrode/electrodes. Alternatively the electrode/electrodes can consist of a conductive material, but in this case said material must be coated with an insulating material. The longitudinal side edges and all corners of the electrode/electrodes should have a rounded surface, since otherwise the electric field will be concentrated there which might result in a formation of clusters of particles.

Preferably the electrode arrangement is adapted to and at least mainly corresponds to the width of the doctor-roll. The electrode arrangement is suitably placed parallelly to the axis of the doctor-roll.

The hard particles are preferably made of a conducting material, for example aluminium oxide or a semiconducting material for example silicon carbide or silica. If semiconducting particles are used suitably the moisture of air in the space between the electrodes and the doctor-roll is increased. In this way the ability of the semiconducting particles to take charge and thereby be polarized is increased. The particles suitably have an average size of about 20–150 μm, preferably 40–90 μm. Usually the particles are dry, but sometimes they can contain a certain amount of liquid, preferably water. However, the liquid content should not be so high that the particles are agglomerating.

The above apparatus according to the present invention with the perfectly working electrode arrangement for releasing the hard particles from the doctor-roll instead of a previously known air knife gives an outstanding evenness of hard particles on the surface of the coated paper web.

The present invention also relates to a process for providing the surface of a decor paper or an overlay paper for an abrasion resistant laminate with an even layer of small hard particles, said process comprising impregnating a continuously fed web of said paper with a liquid thermosetting resin composition and having the surface of the paper wetted with said resin, coating at least one side of the paper web with 2–20 g/m$^2$, preferably 3–15 g/m$^2$ of small and hard particles so that the particles are evenly distributed over the surface of resin on the paper web. Then the resin with the particles coated thereon is dried. The small and hard particles are applied by means of an apparatus including a feed hopper containing the hard particles, the hopper having an outlet extending transversely of said fed paper web, a rotating doctor-roll preferably with an uneven surface placed under the feed hopper and being in communication with said outlet for reception of hard particles therefrom, said doctor-roll being in spaced substantially parallel relation to said paper web fed under the doctor-roll, and a means for releasing the hard particles from the doctor-roll and distributing them evenly on the fed paper web. The process is characterized in that the particles are released by a means comprising an electrode arrangement placed between the feed hopper and the downwards directed vertical tangent (T) of the doctor-roll, the electrod arrangement preferably being enclosed by a casing provided with a downwards directed sliding plate, whereby the hard particles are lifted from the doctor-roll and fluidized by means of an electric field between the electrode arrangement and the doctor-roll resulting in an even amount of particles falling down on the paper web continuously fed under the doctor-roll.

The thermosetting resin used according to the present invention is preferably selected from melamine-formaldehyde resin and radiation curing resins such as epoxy acrylate oligomer, polyester acrylate oligomer, urethan acrylate oligomer, methacrylate oligomer, silicon acrylate oligomer and melamine acrylate oligomer. The radiation curing comprises electron beam curing and UV curing. Usually the thermosetting resin is present as an aqueous solution.

According to one embodiment of the invention one side of the paper is provided with hard particles with an average size of about 40–150 μm, preferably 40–90 μm by the disclosed method. The other side of the paper may then be impregnated with the above thermosetting resin containing above hard particles but with a size of 1–30 μm, preferably 1–10 μm. This coating preferably gives an addition of hard particles of 1–20 μm . Alternatively the two impregnating steps may be made on the same side of the paper with an intermediate drying step.

The present invention also relates to a particle coated decor paper and/or overlay paper produced by the above process.

At the production of a decorative thermosetting laminate one or more particle coated overlay papers can be used together with one or more decor papers with or without any hard particles.

BRIEF DESCRIPTION OF THE DRAWING

The sole FIGURE is a schematic elevation of the apparatus used in the method of the invention.

DETAILED DESCRIPTION OF THE PREFERRED EMBODIMENTS

The present invention will be further illustrated by the enclosed figure and the embodiment examples below.

The FIGURE shows schematically an embodiment of an apparatus 1 and a process according to the invention for even distribution of dry hard particles to the surface of a continuously fed paper web 20 impregnated with a liquid thermoseting resin composition, the resin being wet at the distribution of the hard particles. The apparatus 1 comprises a rotating doctor-roll 2, a feed hopper 3 and an electrode arrangement 4. The hopper 3 holds the hard particles and is provided with an outlet extending transversely of said fed paper web 20. At the outlet a scraper plate 8 is placed to give an even feeding of the particles along the surface of the doctor-roll 2. The doctor-roll 2 is furnished with radially oriented 50–70 μm deep grooves.

A stream of hard particles with an average particle size of 50–80 μm is transferred from the hopper 3 via its outlet to the surface of the doctor-roll 2. The hard particles are lifted from the doctor-roll 2 and fluidized by an electric field between the electrode arrangement 4 and the doctor-roll 2. The electrode arrangement is placed between the hopper 3 and the downwards directed vertical tangent T of the doctor-roll 2.

The doctor-roll 2, the hopper 3 and the paper web 20 have mainly the same voltage potential by being grounded. The electrode arrangement 4 has a negative voltage potential of 5 kV as compared to the doctor-roll 2. In addition the electrode arrangement 4 is enclosed by a casing 5 provided with a sliding plate 7, which is placed so that it is directed towards the downwards directed vertical tangent T of the doctor-roll at an angle of 25°. The sliding plate 7 is succeeded by another sliding plate 6 which is placed under the first sliding plate 7 and has an angle towards the vertical tangent T of 10° C. The inner surface of the sliding plates 6 and 7 had been polished to a highly glossy state.

The sliding plates 6 and 7 have the same voltage potential as the doctor-roll by being grounded. Any possibly remaining charge of the hard particles will thereby be conducted away as soon as they will come in contact with the sliding plates 7 and 6 respectively. The lower edge of the lowermost sliding plate 6 will be situated only a few millimetres from the surface of the paper web 20. Thereby the sliding plate 6 will in addition to conducting away possible charges from the particles also give a sharply limited distribution zone. This will decrease the disturbing influence of air streams and thereby give a more even distribution of the particles on the surface of the paper 20.

Since the hard particles are very small the coating process can be disturbed by air streams which can cause local areas with clusters of particles and other local areas without any particles at all. Therefore, the lowermost sliding plate 6 is furnished with an aerodynamic spoiler 6' at the border between the paper web 20 and the lower part of the plate 6 for avoiding disturbing air streams.

According to an embodiment not shown the sliding plates 7 and 6 respectively are brought to a resonance free vibration by a vibrator. In this way the hard particles are prevented from stopping or sticking to the sliding plates 7 and 6 respectively at their downwards passage.

The electrode arrangement 4 consists of an electrode 4' of a semiconducting material in the form of phenolic plastic. The electrode 4' is electrically connected to a voltage source via an electrically conductive distributor 4" which runs along the main part of the horizontal extension of the electrode 4'. A voltage source is via a cable connected to the distributor 4". The width of the electrode arrangement 4 corresponds mainly to the width of the doctor-roll 2.

The electrode arrangement 4 is on its outside enclosed by a casing 5 comprising the downwards directed sliding plate 7 built together. The casing 5 prevents any unintentional contact even if this is totally harmless as the system does not deliver more than a few $\mu A$. In addition the casing 5 prevents that undesired particles and dirt can enter and by caught by the electric field.

By the design of the sliding plate 7 the electric field will be limited by the extension of the plate 7. Thereby no charge will be induced into particles situated outside the sliding plate 7. Accordingly particles sliding down the further sliding plate 6 will not be influenced by the electric field at their passage downwards. The electrode 4' is designed with rounded longitudinal side edges and a slight bending towards the doctor-roll 2. The electrode 4' may be arranged in such a way that the distance between the doctor-roll 2 and the electrode 4' increases a bit towards the end of the electrode 4' seen from the rotation direction of the doctor-roll 2. Other alternatives, even the opposite arrangement of the electrode is possible, where the distance between the doctor-roll 2 and the electrode 4 decreases a bit towards the end of the electrode 4'.

Example 1 relates to a comparison test where an apparatus shown in the U.S. Pat. No. 4,940,503 was used while Example 2 illustrates the present invention.

EXAMPLE 1

A roll of so-called overlay paper of α-cellulose with a surface weight of 25 $g/m^2$ was impregnated with a solution of melamine-formaldehyde resin to a resin content of 70 percent by weight calculated on dry impregnated paper. Immediately after the impregnation aluminium oxide particles with an average particle size of about 50 $\mu m$ were applied to the upper side of the paper in an amount of 8 $g/m^2$. At the application of the aluminum oxide particles an apparatus according to FIG. 1 of the U.S. Pat. No. 4,940,503 was used. The revolution velocity of the doctor-roll was 1.5 revolutions per minute and the apparatus was provided with an air knife to get the hard particles come loose from the doctor-roll.

Thus, the aluminum oxide particles were applied in the melamine-formaldehyde resin, which had not dried yet. The impregnated paper web was then fed continuously into a heating oven where the solvent was evaporated. At the same time the resin was partially cured to so-called B-stage. Usually the product obtained is called prepreg. At this drying the particles were enclosed in the resin layer and consequently concentrated to the surface of the prepreg produced.

A roll of so-called decor paper with a surface weight of 80 $g/m^2$ was treated in the same way as the overlay paper. The resin content was 46 percent by weight calculated on dry impregnated paper. However, no aluminum oxide particles were applied.

A roll of Kraft paper with a surface weight of 170 $g/m^2$ was also treated in the same way with the exception that the resin consisted of phenol-formaldehyde resin instead of melamine-formaldehyde resin and no aluminum oxide particles were applied. The resin content was 30 percent calculated on dry impregnated paper.

Two of the above Kraft paper sheets impregnated with phenol-formaldehyde resin (so-called core paper), one decor paper and two overlay papers were placed between two press plates. The two overlay papers were placed so that the particle coated sides were facing each other. These sheets were pressed in a conventional multi-opening press at a pressure of 90 $kp/cm^2$ and a temperature of 145° C. to a homogenous decorative laminate.

The abrasion resistance of the laminate obtained was tested according to the ISO-standard 4586/2-88 by means of an apparatus called Taber Abraser, model 503. According to said standard the abrasion of the decor layer of the finished laminate is measured in two steps. In step 1 the so-called IP-point (initial point) is measured, where the starting abrasion takes place.

In step 2 the so-called FP-point (final-point) is measured, where 95% of the decor layer has been abrased.

Moreover, the above ISO-standard stipulates that the number of revolutions obtained with the test machine in step 1 and step 2 are added whereupon the sum obtained is divided with 2. Thereby, the 50 percent point for abrasion is obtained, which is normally reported in standards and offprints.

However, in the present and the following example only the IP-point is used.

At the test of the above laminate a value of 8200 revolutions was obtained for the IP-point. A few patchy or hazy areas could be found on the surface of the laminate.

EXAMPLE 2

The process according to Example 1 was repeated with the difference that an apparatus according to the FIGURE of the present invention was used for application of the aluminum oxide particles. Thus the device was provided with an electrode arrangement with a negative voltage potential of 5 kV as compared to the doctor-roll, instead of an air knife for releasing the particles from the doctor-roll.

At the test of the laminate produced a value of 9600 revolutions was obtained for the IP-point. Thus, the abrasion resistance was far better than by using the known apparatus. Generally an increase of the abrasion resistance by 10–20% is obtained as compared to the known method of Example 1. In addition a much more even distribution of the particles could be observed and no patchy or hazy areas could be traced on the surface of the laminate.

Much larger amounts of hard particles can be applied before problems with patchy or hazy areas occur.

What is claimed is:

1. Apparatus for even distribution of particles having an average size of 20–150 $\mu m$, the particles being selected from the group consisting of aluminum oxide, silicon carbide and silica, to the surface of a continuously fed paper web impregnated with a liquid thermosetting resin composition, the resin being wet at the distribution of the particles, the apparatus including a feed hopper containing the particles, the hopper having an outlet extending transversely of said fed paper web, a rotating doctor roll placed under the feed hopper and being in communication with said outlet for reception of particles therefrom, said doctor roll being spaced from and in substantially parallel relation to said paper web fed under the doctor roll, and a means for releasing the particles from the doctor roll and distributing them evenly on the fed paper web, wherein said means comprises an electrode arrangement placed between the feed hopper and a downwardly directed vertical tangent of the doctor roll, wherein the electrode arrangement is enclosed by a casing provided with a downwardly directed sliding plate, whereby the particles are lifted from the doctor roll and fluidized by means of an electric field between the electrode arrangement and the doctor roll resulting in an even distribution of particles falling down on the paper web fed under the doctor-roll.

2. Apparatus according to claim 1, wherein the doctor roll, the feed hopper and the paper web have about the same voltage potential and the electrode arrangement has a positive or a negative voltage potential of about 1–15 kV as compared to the doctor roll.

3. Apparatus according to claim 1, wherein the doctor roll is grounded and thereby uncharged.

4. Apparatus according to claim 1, wherein the sliding plate is placed in such a way that at least an imaginary extension of the sliding plate along a plane of the sliding plate will cross the downwardly directed tangent at an angle of 5–50°, and the sliding plate is optionally followed by further sliding plates which are placed under the first sliding plate and have an angle towards the vertical tangent of 5–50°.

5. Apparatus according to claim 4, wherein the sliding plate and the optional further sliding plates have the same voltage potential as the doctor roll.

6. Apparatus according to claim 4, wherein the surface of the sliding plate and the optional further sliding plates facing the distributed particles are polished to a glossy state.

7. Apparatus according to claim 4, wherein the sliding plate and the optional further sliding plates are operatively connected to a vibrator, whereby the particles are prevented from stopping or sticking to the sliding plate and/or the optional sliding plates at their downwards passage.

8. Apparatus according to claim 1, wherein the electrode arrangement consists of at least one electrode and the at least one electrode is electrically connected to a voltage source via an electrically conductive distributor which runs along the main part of a horizontal extension of the at least one electrode.

9. An apparatus according to claim 1, wherein the width of the electrode arrangement is adapted to the width of the doctor roll.

10. An apparatus according to claim 9, wherein the longitudinal side edges of the at least one electrode have a rounded surface.

11. An apparatus according to claim 1, wherein the electrode arrangement is placed parallel to the axis of the doctor roll.

12. An apparatus according to claim 8, wherein the distance between the electrode and the doctor roll is about 2–50 mm.

13. An apparatus according to claim 1, wherein a scraper plate is placed at the outlet of the hopper to give an even feeding of the particle along the surface of the doctor roll.

14. The apparatus according to claim 1, wherein said rotating doctor roll has an uneven surface.

15. The apparatus according to claim 2, wherein said same voltage potential is a negative voltage potential.

16. The apparatus according to claim 2, wherein said electrode arrangement has a voltage potential of 2–8 kV as compared to the doctor roll.

17. The apparatus according to claim 4, further comprising spoilers attached to the lowermost sliding plate.

18. The apparatus according to claim 8, wherein said at least one electrode is formed of a semiconducting material.

19. The apparatus according to claim 18, wherein said semiconducting material comprises a phenolic resin.

20. The apparatus according to claim 8, wherein said at least one electrode comprises a plurality of electrodes.

21. The apparatus according to claim 13, wherein said distance is about 3–30 mm.

22. Process for providing the surface of a decor paper or an overlay paper for an abrasion resistant laminate with an even layer of particles consisting of aluminum oxide, silicon carbide and, said process comprising impregnating a continuously fed web of said paper with a liquid thermosetting resin composition and having the surface of the paper wetted with said resin, coating at least one side of the paper web with 2–20 $g/m^2$ of the particles so that the particles are evenly distributed over the surface of resin on the paper web, the small hard particles having an average particle size of 20–150 $\mu$m and being selected from the group consisting of aluminum oxide, silica and silicon carbide, then drying the resin with the particles coated thereon, the particles being applied by means of an apparatus including a feed hopper containing the particles, the hopper having an outlet extending transversely of said fed paper web, a rotating doctor roll placed under the feed hopper and being in communication with said outlet for reception of said particles therefrom, said doctor roll being spaced from and in substantially parallel relation to said paper web fed under the doctor roll, and a means for releasing the hard particles from the doctor roll and distributing them evenly on the fed paper web, wherein the particles are released by a means comprising an electrode arrangement placed between the feed hopper and a downwardly directed vertical tangent of the doctor roll, the electrode arrangement is enclosed by a casing provided with a downwardly directed sliding plate, whereby the particles are lifted from the doctor roll and fluidized by means of an electric field between the electrode arrangement and the doctor roll resulting in an even distribution of particles falling down on the paper web continuously fed under the doctor roll.

23. Process according to claim 22, wherein the thermosetting resin is selected from the group consisting of melamine-formaldehyde resin and radiation curing resins.

24. Process according to claim 22, wherein the thermosetting resin is present as an aqueous solution.

25. Process according to claim 22, wherein the particles are α-aluminum oxide.

26. The process according to claim 22, wherein said coating at least one side of the paper web is provided with 3–15 $g/m^2$ of the particles.

27. The process according to claim 22, wherein said rotating doctor roll has an uneven surface.

28. The process according to claim 22, wherein the resin is one selected from the group consisting of epoxy acrylate oligomer, polyester acrylate oligomer, urethane acrylate oligomer, methacrylate oligomer, silicon acrylate oligomer and melamine acrylate oligomer.

* * * * *